United States Patent
Piron et al.

(10) Patent No.: US 6,605,957 B1
(45) Date of Patent: Aug. 12, 2003

(54) LOGIC INPUT CIRCUIT WITH ENERGY TRANSFER WITH INPUT VOLTAGE MATCHING

(75) Inventors: Patrick Piron, Isle d'Abeau (FR); Richard Drevon, Isle d'Abeau (FR); Olivier Francois, Cremieu (FR)

(73) Assignee: Soprano, Vaulx Milieu (FR)

( * ) Notice: Subject to any disclaimer, the term of this patent is extended or adjusted under 35 U.S.C. 154(b) by 174 days.

(21) Appl. No.: 09/831,518

(22) PCT Filed: Sep. 8, 2000

(86) PCT No.: PCT/FR00/02484

§ 371 (c)(1),
(2), (4) Date: Aug. 3, 2001

(87) PCT Pub. No.: WO01/20414

PCT Pub. Date: Mar. 22, 2001

(30) Foreign Application Priority Data

Sep. 10, 1999 (FR) .......................................... 99 11491

(51) Int. Cl.⁷ ............................................... H02M 3/335
(52) U.S. Cl. ......................... 326/30; 326/33; 326/136; 363/71
(58) Field of Search ........................ 326/21, 30, 33, 326/31, 32, 136; 327/104, 427, 434, 447, 547

(56) References Cited

U.S. PATENT DOCUMENTS

| 5,982,642 | A | * | 11/1999 | Herfurth | ...................... | 363/21 |
| 6,411,532 | B1 | * | 6/2002 | Piron | .......................... | 363/71 |

FOREIGN PATENT DOCUMENTS

| EP | 0 107 797 A1 | 5/1984 |
| WO | WO 90/04187 | 4/1990 |
| WO | WO 96/33086 | 10/1996 |

* cited by examiner

Primary Examiner—Michael Tokar
Assistant Examiner—Anh Q. Tran
(74) Attorney, Agent, or Firm—Oliff & Berridge, PLC

(57) ABSTRACT

A logic input circuit for an industrial equipment automatic control system supplied by a DC voltage source, in particular a battery (16), comprises a voltage step-up energy converter (12) composed of an inductance coil (L) and a switching transistor (TR), connected to the input (E1) of the circuit (10); a logic level detector (DL) having a optocoupler; and a clock circuit (H) controlling the transistor (TR) by adjusting the frequency or the duty cycle to perform voltage matching with the signals applied to the input (E1), and also the value of the voltage surge generated in logic high state (1) by the inductance coil (L) when switching of the transistor (TR) to the off state takes place.

7 Claims, 1 Drawing Sheet

LOGIC INPUT CIRCUIT WITH ENERGY TRANSFER WITH INPUT VOLTAGE MATCHING

BACKGROUND OF THE INVENTION

The invention relates to a logic input circuit for an industrial equipment automatic control system supplied by a DC voltage source, in particular a battery, said input circuit comprising means for detection designed to deliver a measurement signal representative of the logic state when opening and closing of an input contact take place, with a very low heat dissipation.

STATE OF THE ART

A logic input board in electronic equipment for automatic control systems of in-board installations, in particular of rail transport vehicles, generally requires a large input current of about 10 mA. The problem arising in conventional equipment is then that of heat dissipation in the measuring resistors, as a logic input in a voltage of 110 Volts for example, and a current with an intensity of 10 mA, will dissipate a thermal power of 1.1 W. The global heat dissipation is naturally proportional to the number of logic inputs and often requires the use of cooling devices by heat sink or heat pipes to remove the heat to the outside. As electrical power supply of the equipment is performed from a safety power system with a battery bank, this results in addition in a loss of electrical power of the vehicle.

OBJECT OF THE INVENTION

The object of the invention is to achieve a logic input circuit for an automatic control system, with voltage matching over a wide range of input voltages, and presenting a very low heat dissipation.

The input circuit according to the invention is characterized in that it comprises:
- a voltage step-up energy converter composed of an inductance coil and a switching transistor, connected to the input of the circuit,
- a logic level detector connected either between the inductance coil and a rectifier diode of an energy recovery circuit or between a charging resistor and the DC voltage source,
- and a clock circuit controlling switching of the transistor by adjustment of the frequency and duty cycle to perform voltage matching with the signals applied to the input, and also the value of the voltage surge generated in logic high state by the inductance coil when switching of the transistor to the off state takes place.

Detection of the logic state is performed with a very low heat dissipation avoiding the use of heat sinks. Most of the energy is restored to the battery by the energy recovery circuit. The presence of the energy converter associated to the inductance coil avoids voltage step-up transformers having to be used.

The logic level detector advantageously comprises an optocoupler having an emitting diode through which the measuring current flows, and a receiver delivering an image of the measurement signal to an acquisition circuit.

According to one feature of the invention, the energy recovery circuit is provided with a charging resistor connected in series between the rectifier diode and the battery, or the emitting diode of the logic level detector. A first filtering capacitor is connected in parallel between the input potential reference and the mid-point of connection of the rectifier diode to the resistor. A second filtering capacitor is connected between the two input terminals.

Other advantages and features will become more clearly apparent from the following description of an embodiment of the invention given as a non-restrictive example only and represented in the accompanying drawings in which.

DESCRIPTION OF A PREFERRED EMBODIMENT

Figure 1:
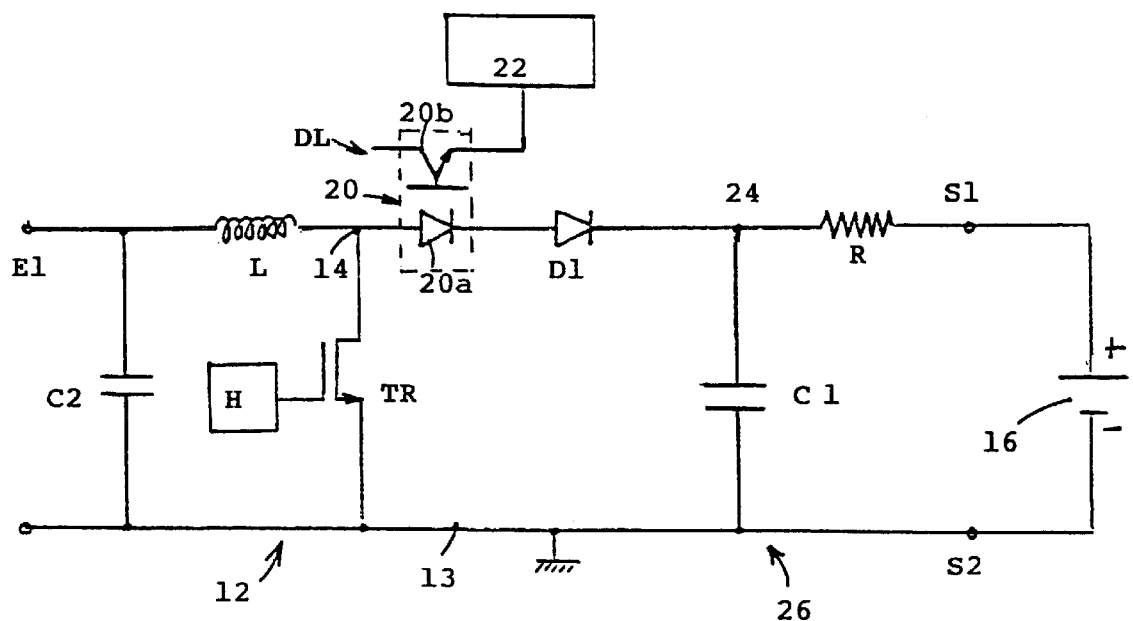
FIG. 1 represents the wiring diagram of a logic input circuit according to the invention.

In FIG. 1, a logic input circuit 10 of electronic equipment for an industrial automatic control system comprises an input E1 connected to a voltage step-up energy converter 12 comprising an inductance coil L associated to a switching transistor TR. The emitter of the switching transistor TR is connected to the input potential reference 13, and the collector is connected to the mid-point 14 of connection of the inductance coil L to a logic level detector DL. The base of the transistor TR is controlled by a dock circuit H designed to perform voltage matching of the input signals by adjusting the frequency and duty cycle. It is thus possible to apply voltage values comprised between 24V and 110V to the input E1 depending on the type of battery 16. The input potential reference 13 is at the potential of the negative pole of the battery 16.

The logic level detector DL is formed for example by an optocoupling element 20 the receiver 20b whereof delivers a measurement signal SE to a data acquisition circuit 22, said control signal SE being representative of the logic state on the input E1. The anode of the emitting diode 20a of the optocoupler 20 is connected to the mid-point 14, whereas the cathode is connected to the positive pole of the battery 16 via a rectifier diode D1 in series with a resistor R. A first filtering capacitor C1 is connected in parallel between the input potential reference 13, and the mid-point 24 of connection of the diode D1 to the resistor R. A second filtering capacitor C2 is connected between the input potential reference 13 and the other input E1.

The rectifier diode D1, resistor R and first filtering capacitor C1 constitute an energy recovery circuit 26, the outputs S1 and S2 whereof are connected in parallel to the terminals of the battery 16.

The switching transistor TR can be formed by a MOS, FET, IGBT, etc. transistor. The other logic input circuits (not represented) are identical to the one described previously and are all connected in parallel to the terminals of the battery 16.

Operation of the logic input circuit 10 is as follows:

The elements of the logic input circuit 10, in particular the switching transistor TR, are dimensioned for the maximum input voltage, for example 110V. The input E1 can be voltage matched by adjusting the frequency of the dock circuit H and by adjusting the duty cycle thereof. It thus enables the time during which the switching transistor TR is turned on and off to be adjusted.

In logic low state (0), the voltage applied to the input E1 is zero and turn-off of the diode D1 prevents any current flow in the inductance coil L, whether the transistor TR is on or off. The optocoupler 20 also remains off and there is no current flowing therethrough.

In logic high state (1), the voltage applied to the input E1 is appreciably equal to the voltage of the battery 16. When the transistor TR is turned on, a current is established between the input E1 and the input potential reference 13 flowing in the inductance coil L. After the transistor TR has switched to the off state, the inductance coil L generates a voltage surge at the terminals of the transistor TR and the potential of the mid-point 14 becomes higher than that of the output S1 connected to the positive pole of the battery 16. A mean current of about 10 mA is then established in the direction of the battery 16, passing through the resistor R. Detection of the logic high state (1) is performed by transmission of the measurement signal SE to the acquisition circuit 22, which transmission is performed with a very low heat dissipation, since most of the energy is restored to the battery 16 by the energy recovery circuit 26.

The voltage increase at the mid-point 14 is relatively low to preserve a good efficiency, but sufficient to ensure flow of the mean current of 10 mA. The value of the voltage increase is a function of the duty cycle of the transistor TR, and enables the logic input circuit 10 to work in constant current regardless of the input voltage. The terminal of the transistor TR opposite the mid-point 14 is advantageously at the input potential reference, which simplifies simultaneous control of several transistors in case of a plurality of logic inputs in parallel.

Figure 2:
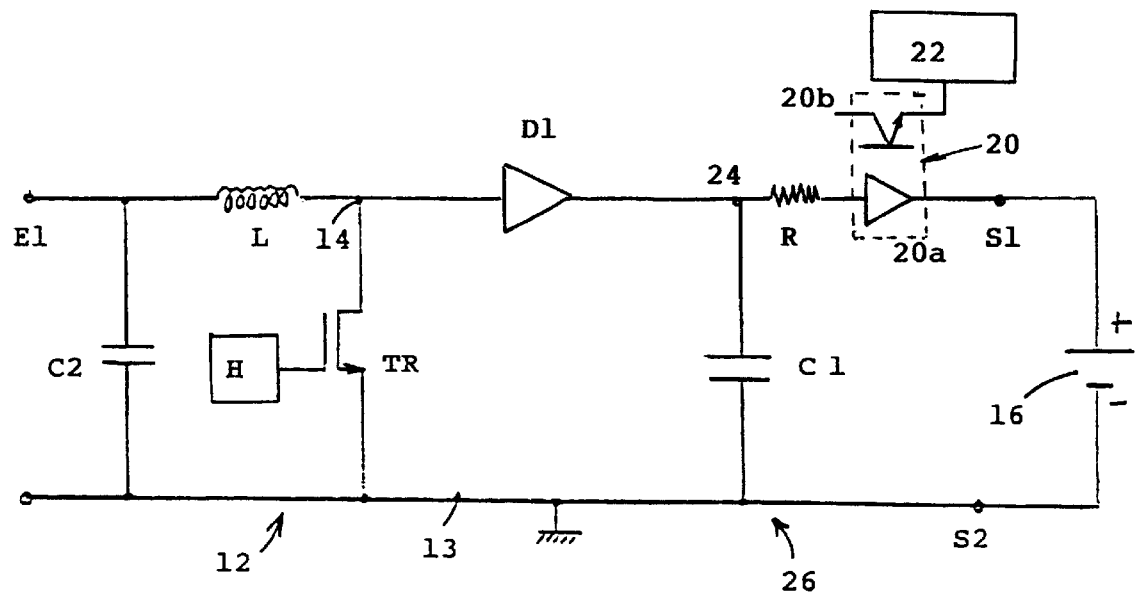
FIG. 2 shows the wiring diagram of an alternative embodiment.

With reference to FIG. 2, the optocoupler 20 is removed from the front end to the DC side being electrically connected between the resistor R and the DC voltage source 16.

What is claimed is:

1. A logic input circuit for an industrial equipment automatic control system supplied by a DC voltage source, in particular a battery, said input circuit comprising means for detection designed to deliver a measurement signal representative of logic low state and of logic high state, comprising:

a voltage step-up energy converter composed of an inductance coil and a switching transistor, connected to the input of the circuit, a logic level detector connected either between the inductance coil and a rectifier diode of an energy recovery circuit or between a charging resistor and the positive pole of the DC voltage source, and a dock circuit controlling switching of the transistor by adjustment of the frequency and duty cycle to perform voltage matching with the signals applied to the input, and also the value of the voltage surge generated in logic high state by the inductance coil when switching of the transistor to the off state takes place.

2. The logic input circuit according to claim 1, wherein the switching transistor is connected between the input potential reference and a mid-point of connection of the inductance coil to the logic level detector or to the rectifier diode.

3. The logic input circuit according to claim 1, wherein the logic level detector comprises an optocoupler having an emitting diode connected between the inductance coil and the rectifier diode, and a receiver delivering said measurement signal to an acquisition circuit.

4. The logic input circuit according to claim 1, wherein the logic level detector comprises an optocoupler having an emitting diode connected between the charging resistor and the positive pole of the voltage source, and a receiver delivering said measurement signal to an acquisition circuit.

5. The logic input circuit according to claim 1, wherein the resistor of the energy recovery circuit is electrically connected in series between the rectifier diode and the battery or the emitting diode.

6. The logic input circuit according to claim 5, wherein a first filtering capacitor is connected in parallel between the input potential reference and the mid-point of connection of the rectifier diode to the resistor.

7. The logic input circuit according to claim 6, wherein a second filtering capacitor is connected in parallel between the input potential reference and the input.

\* \* \* \* \*